No. 628,027. Patented July 4, 1899.
M. J. OWENS.
ART OF MAKING GLASS ARTICLES.
(Application filed Mar. 16, 1898.)
(No Model.)
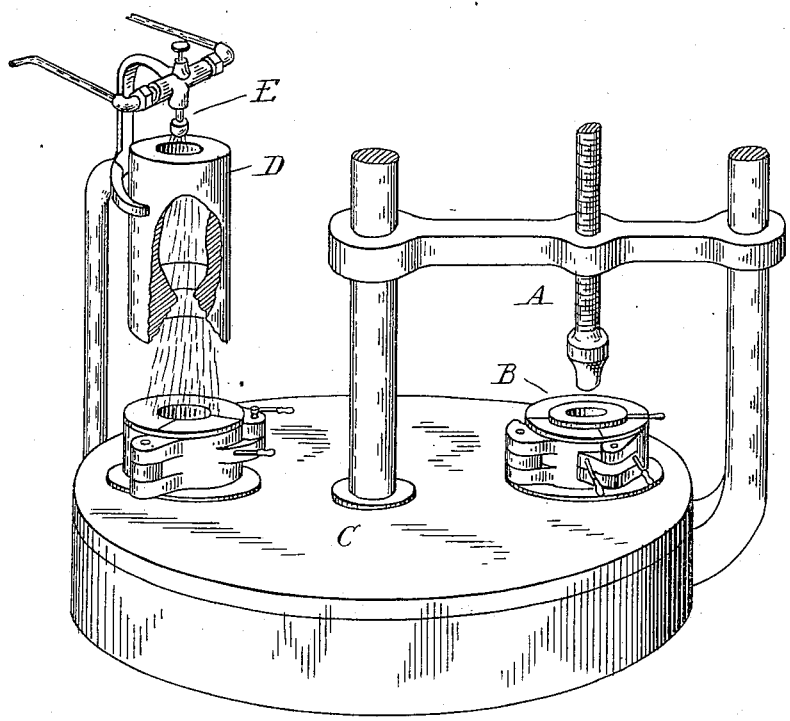
Witnesses:
Inventor
Michael J. Owens,
By Thos. S. Sprague & Son
Attorneys.

UNITED STATES PATENT OFFICE.

MICHAEL J. OWENS, OF TOLEDO, OHIO.

ART OF MAKING GLASS ARTICLES.

SPECIFICATION forming part of Letters Patent No. 628,027, dated July 4, 1899.

Application filed March 16, 1898. Serial No. 674,123. (No model.)

*To all whom it may concern:*

Be it known that I, MICHAEL J. OWENS, a citizen of the United States, residing at Toledo, in the county of Lucas and State of Ohio, have invented certain new and useful Improvements in the Art of Making Glass Articles, of which the following is a specification, reference being had therein to the accompanying drawing.

My invention relates to an improvement in the art of making glass articles.

My invention consists in a new method of finishing or polishing the face of glass articles.

In the drawing I have shown a diagrammatic perspective view of a machine which may be used to carry out my invention.

In the present state of the art in making cut-glass articles the necessary fine polished interior surface for such ware is obtained by blowing the article.

Pressed articles are made by pressing the article in a mold, allowing it to cool, and then removing it from its mold and taking it to a furnace and fire-finishing it; but it is found that in pressed articles the plunger or die leaves on the surface imperfections, and these become permanent in the glass when the article cools, so they cannot be removed by any usual process, such as fire-finishing. The result is that all high grades of glass articles—such as cut-glass, for instance—are necessarily blown in order to get the desired finish on the interior face.

In the drawing I have shown any known type of press, A being the plunger, actuated by any suitable means, (not shown,) and B the usual sectional mold, which in this case I have shown supported on a revoluble table C, supported on any suitable frame. Preferably on or adjacent to the frame which supports the table C is a furnace. In this case I have shown it formed by a combustion-chamber D in the shape of a tube or nozzle, lined with refractory material, into which there is a gas-jet from the nozzle E. This jet may be formed by gas or air and oil or by any other suitable fuel. The combustion-chamber is so shaped and located as to direct the flame down, so that when the mold is beneath the heat will be directed within. The parts being thus arranged, the operator first shapes the article in the mold by lowering the plunger A, withdraws the plunger, and then rotates the table C to bring the mold directly under the nozzle D. While the shaped article is still in its plastic condition and before the glaze or enamel has formed or "set" on the inner surface of the same and while the article is supported by the mold the heat is applied to its inner surface, which is softened or melted, and a smooth and perfect finish produced thereon. In other words, before the imperfections imparted to the inner face of the mold by the plunger have become permanent by the formation of the glaze the heat of the blast or flame will melt it and cause it to obliterate those imperfections entirely in a way which cannot be done after they have once set, and I am able to do this without distortion of the article in its plastic condition by operating on it while supported in its mold. Thus I am enabled to shape articles for cut-glass or other high-grade glassware by pressing, which is much quicker and cheaper than by blowing.

I believe I am the first to polish the inner face of molded or pressed articles of glassware by reheating their inner surface to melt and smooth the same after they have been shaped and before they have hardened sufficiently to form the glaze thereon. The outer surface may be finished by cutting and polishing in any manner; also, that I am the first to support an article in its mold and direct the polishing blast or heat therein so as to prevent the distortion of the article by the heat while producing a perfect polish or finish on its inner face.

I do not herein make any claim for the machine, as any desired mechanism may be employed for carrying out my method, and the machine has no part in my present invention.

What I claim as my invention is—

1. The herein-described improvement in the art of making glass articles, consisting in shaping a portion of molten glass, then reheating its face while yet in a plastic condition and before a glaze is formed, sufficiently to remelt it and thereby to form a smooth surface, and then to allow it to cool.

2. The herein-described improvement in the art of making glass articles consisting in pressing a portion of molten glass into the desired shape, and then while it retains sufficient of its original heat to prevent the forming of the glaze to subject its surface to heat sufficient to form a perfectly smooth surface, and then to allow it to cool.

3. The herein-described improvement in the art of making glass articles, consisting in pressing molten glass, and then while supported in its mold and before it has lost sufficient heat to permit the formation of a glaze on its surface, to subject its surface to heat sufficient to remelt the surface to thereby form a perfectly smooth surface, and then to allow it to cool.

4. The herein-described process in the making of glass articles, consisting in first shaping by proper instruments a mass of plastic glass, and then while the shaped article is still in a plastic condition (that is before it has cooled sufficiently to form a glaze) to subject the surface desired to be finished, to reheating, sufficient to form a perfectly smooth surface, and then to allow the article to cool.

In testimony whereof I affix my signature in presence of two witnesses.

MICHAEL J. OWENS.

Witnesses:
F. D. SUYDAM, Jr.,
T. H. MILLER.